(12) United States Patent
Opitz

(10) Patent No.: US 8,971,385 B2
(45) Date of Patent: Mar. 3, 2015

(54) SIGNAL ACQUISITION METHOD AND SIGNAL ACQUISITION ARRANGEMENT FOR SPREAD SPECTRUM SIGNALS

(75) Inventor: Martin Opitz, Regensburg (DE)

(73) Assignee: Continental Automotive GmbH, Hanover (DE)

( * ) Notice: Subject to any disclaimer, the term of this patent is extended or adjusted under 35 U.S.C. 154(b) by 0 days.

(21) Appl. No.: 13/988,781

(22) PCT Filed: Nov. 22, 2011

(86) PCT No.: PCT/EP2011/070679
§ 371 (c)(1),
(2), (4) Date: May 22, 2013

(87) PCT Pub. No.: WO2012/069471
PCT Pub. Date: May 31, 2012

(65) Prior Publication Data
US 2013/0235909 A1 Sep. 12, 2013

(30) Foreign Application Priority Data
Nov. 22, 2010 (DE) .......................... 10 2010 044 217

(51) Int. Cl.
*H04B 1/00* (2006.01)
*H04B 1/709* (2011.01)
(Continued)

(52) U.S. Cl.
CPC ............ *H04B 1/709* (2013.01); *H04B 1/70751* (2013.01); *H04B 1/7102* (2013.01)
USPC ........... 375/148; 375/150; 375/260; 375/267; 375/343; 375/346

(58) Field of Classification Search
CPC .......... G01S 19/30; G01S 19/22; G01S 19/24; G01S 19/258; G01S 19/40; G01S 1/045; G01S 19/28; H04B 1/7085; H04B 1/7075; H04B 1/709; H04B 2001/70706; H04B 1/7077; H04B 1/7093; H04B 27/227; H04B 1/70751; H04B 1/7102
USPC .......... 375/148, 146, 147, 150, 260, 262, 267
See application file for complete search history.

(56) References Cited

U.S. PATENT DOCUMENTS 8,072,376 B2* 12/2011 Lennen .................... 342/357.63
8,442,095 B2* 5/2013 Ahmed et al. ................. 375/150
2012/0026901 A1* 2/2012 Gao et al. ...................... 370/252

OTHER PUBLICATIONS

Spangenberg, Sascha et al., "An FFT-Based Approach for Fast Acquistion in Spread Spectrum Communication Systems," Wireless Personal Communications, vol. 13, 27 pages, 2000.
(Continued)

*Primary Examiner* — Dhaval Patel
(74) *Attorney, Agent, or Firm* — King & Spalding L.L.P.

(57) ABSTRACT

A method and arrangement are disclosed for acquiring a spread spectrum signal produced by means of transmitter-end spreading of a bit sequence using a spread code signal, which provide for the reception of the spread spectrum signal; provision of a receiver-end spread code signal which corresponds to the transmitter-end spread code signal; performance of polyphase correlations for respective different code phases which give rise to polyphase correlation results which are each associated with different code phases; filtration using at least two of the code phases; determination of an extreme value in the filtered polyphase correlation results, and determination of the code phase which is associated with the extreme value.

18 Claims, 10 Drawing Sheets

(51) Int. Cl.
*H04B 1/7075* (2011.01)
*H04B 1/71* (2011.01)

(56) References Cited

OTHER PUBLICATIONS

Frai, Danny M., "Fast Acquisition CDMA Receiver for Burst Transmission System," Electronics, Circuits, and Systems, IEEE, 4 pages, 2004.

Maffei, Marco et al., "Code Detection at Launch and Early Orbit Phase for CDMA TT&C," Signal Processing for Space Communications, 12 pages, 2008.

Guoliang, Sun et al., "A Fast Acquisition Algorithm Based on FFT for DSSS Signal," International Conference on Communications and Mobile Computing, 4 pages, 2009.

Du, Xiaohua et al., "Analysis on PN Code Acquisition Performance in DS-SS over Multipath Environment," $3^{rd}$ International Congress on Image and Signal Processing, 5 pages, 2010.

International Search Report and Written Opinion, Application No. PCT/EP2011/070679, 18 pages, Feb. 13, 2012.

* cited by examiner

FIG 7
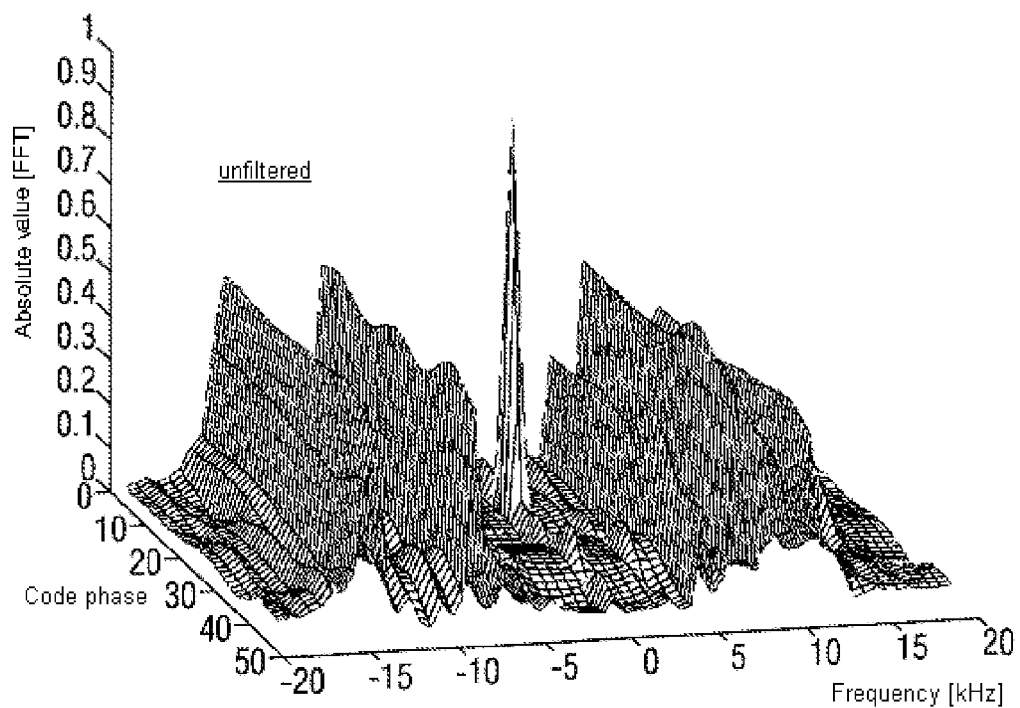
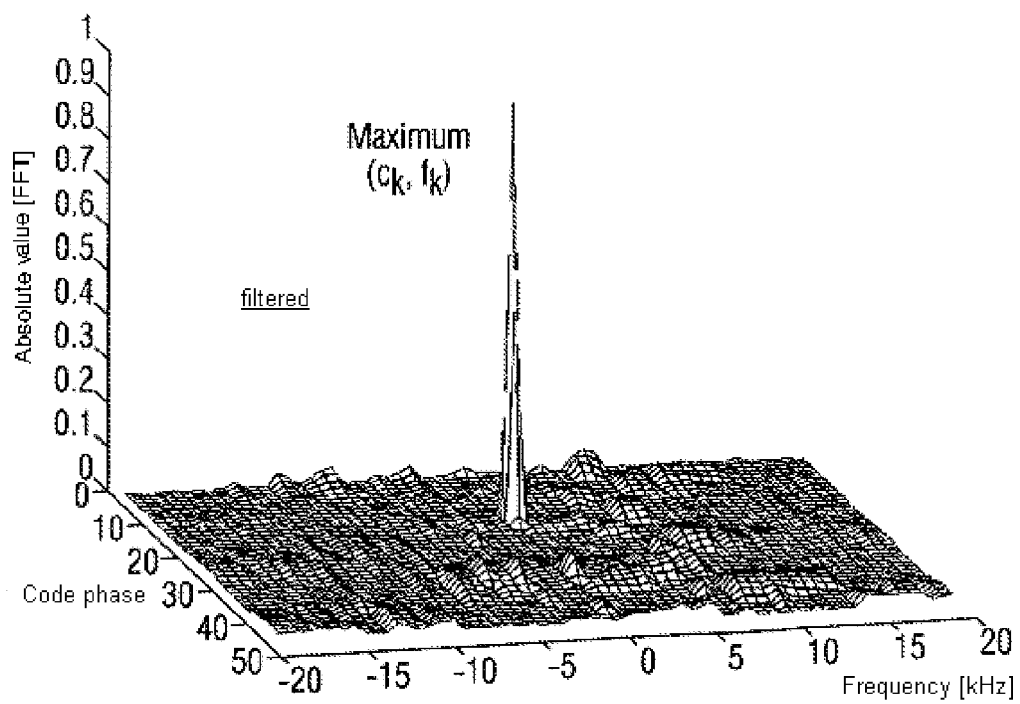

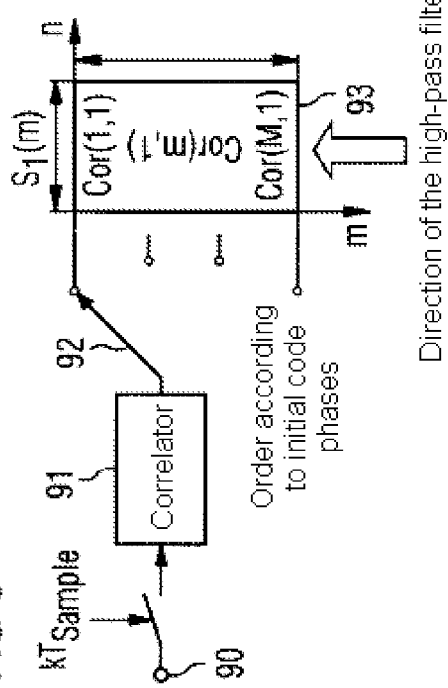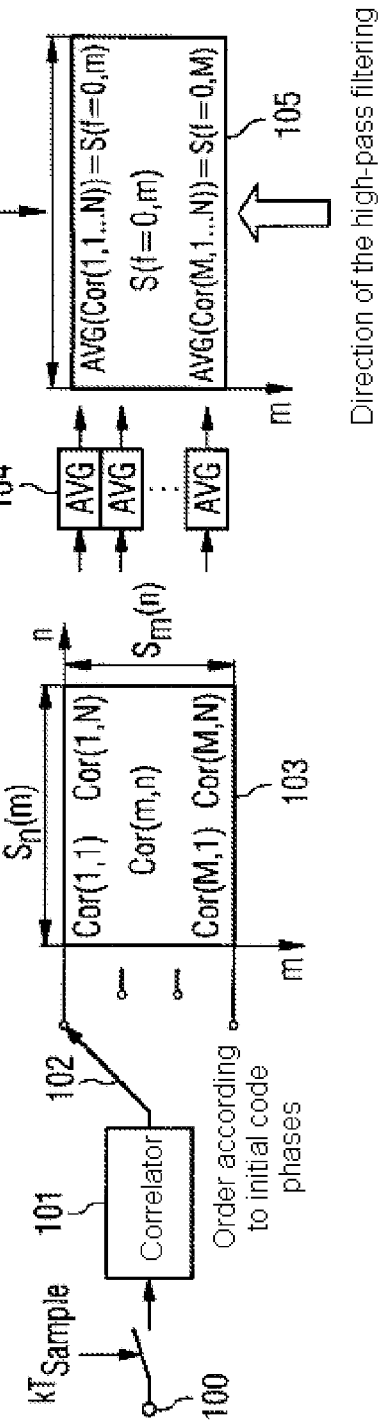

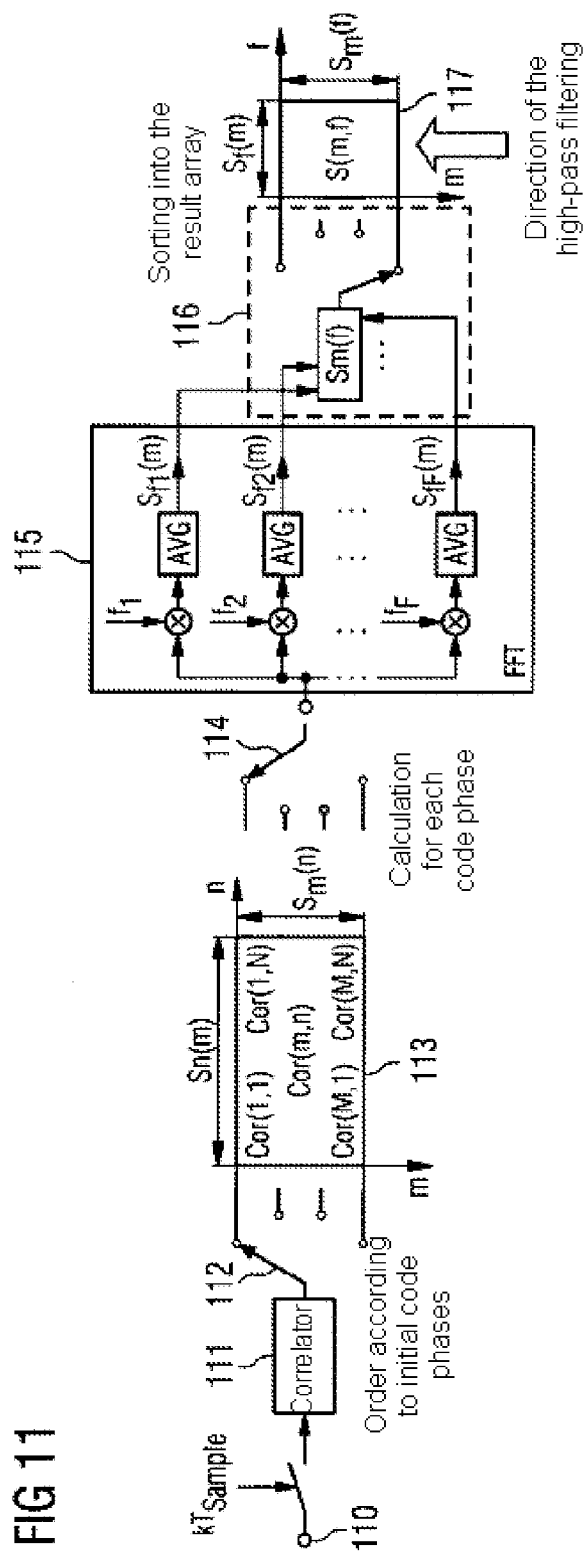

SIGNAL ACQUISITION METHOD AND SIGNAL ACQUISITION ARRANGEMENT FOR SPREAD SPECTRUM SIGNALS

CROSS-REFERENCE TO RELATED APPLICATIONS

This application is a U.S. National Stage application of International Application No. PCT/EP2011/070679 filed Nov. 22, 2011, which designates the United States of America, and claims priority to DE Application No. 10 2010 044 217.8 filed Nov. 22, 2010, the contents of which are hereby incorporated by reference in their entirety.

TECHNICAL FIELD

The present disclosure relates to a signal acquisition method and a signal acquisition arrangement for spread spectrum signals.

BACKGROUND

Wireless signal transmission is significant in a series of applications. By way of example, a large number of functions in motor vehicles are increasingly initiated or controlled by means of remote controls. Usually, a radio link is used in license-free frequency bands for the transmission from and to the motor vehicle. For vehicle entry and also for starting the engine, for example, these are what are known as remote keyless entry systems (RKE systems for short), as are used in radio central locking systems, for example. Local area radio networks such as WLAN networks (for example based on the IEEE802.11 standard) and GPS systems also make use of wireless signal transmission and, in the course of this, also frequently of transmission methods using band spreading. There are various band spreading transmission methods in existence, but currently two methods are most common.

Firstly, these are DSSS methods (DSSS: Direct Sequence Spread Spectrum), in which the symbol energy is distributed over a large bandwidth. To this end, the useful data stream to be transmitted is multiplied by the spread code, the chip rate of which is higher than the data rate of the useful data stream. The code sequence comprises chips—the information to be transmitted comprises bits. By way of example, pseudo random bit stream (PRBS) codes or pseudo static codes (PN codes) are used. The spreading means that a greater bandwidth is required for transmission. The longer the spread code, the more bandwidth is needed. At the same time, however, the energy density in the spectrum is reduced, which means that other signals are disturbed less. The useful data stream can be reconstructed at the receiver again only by using the correct chip sequence.

Secondly, the wireless data transmission also involves the use of CDMA methods (CDMA: Code Division Multiple Access). CDMA methods are code division multiplex methods for the simultaneous transmission of a multiplicity of useful data streams which all use the same frequency resource. The jointly simultaneously used frequency range has a much greater bandwidth than each individual useful data stream would require separately without spectrum spreading. In order to implement this relatively great bandwidth, band spreading methods are again used.

For the implementation of wireless radio links, over distances of 2 km, for example, there is the problem, particularly in the USA, that high transmission and radio powers (up to 1 W or 30 dBm) are admissible only for large frequency bandwidths that are used (e.g. >500 kHz).

In order to achieve use of the prescribed frequency bandwidth, the data are transmitted with the same data rate but with an increased chip rate in comparison with a narrowband transmission. The link budget of the transmission link is therefore not impaired in comparison with a narrowband transmission. By contrast, an increased data rate would result in lower receiver sensitivities and hence shorter system ranges. In order to be permitted to send at high transmission powers, e.g. in a frequency range from 902 MHz to 928 MHz, it is therefore necessary to use a band spreading modulation method such as DSSS or CDMA in order to distribute the transmission power over large frequency bandwidths (e.g. >500 kHz). A further advantage of band spreading transmission methods is that the useful data can be transmitted in a manner that is secure from eavesdropping.

In this case, a narrowband data signal is thus transmitted after having been subjected to band spreading and is despread again at the receiver. The basis for the receiver-end despreading is what is known as signal acquisition, which also includes the ascertainment of parameters that are required for the signal despreading (for example code phase, frequency errors, starting parameters for tracking mechanisms). Following successful signal acquisition, the signal can be despread and the bit string that has been sent can be detected.

In order to be able to detect the bit string/information to be transmitted at the receiver end, for example, it is necessary for the spread spectrum signal to be correlated to the same spread code, in particular. As a basis for the correct detection of the bit information, i.e. so that despreading of the wanted signal WS can be achieved, it is necessary for the phase difference between the spread code signal at the transmitter end and the spread code signal at the receiver end to be small, at best zero, during the correlation and hence during the despreading. Therefore, the time offset that can be assumed by the receiver (initial code phase) should correspond to a small code phase difference during the despreading. The receiver does not know the time offset that is to be assumed a priori, and said time offset is the main purpose of the signal acquisition.

During reception, it is necessary to take account of the inevitable presence of primarily narrowband disturbance signals, which influence particularly the radio channel that is used for the wireless transmission. These disturbance signals can hamper the ascertainment of the initial code phase at the receiver end, for example.

A particularly important receiver parameter is the signal-to-jammer ratio (SJR), i.e. the ratio of the powers of the wanted signal WS and a disturbance signal JS. The aim of any acquisition method is to keep down the signal-to-jammer ratio (SJR) at which successful acquisition is still possible. On the one hand, every band spreading modulation method has inherent disturbance signal rejection (spreading gain), which on its own already reduces the SJR, and on the other hand additional disturbance signal rejection which reduces the SJR further is desirable.

Methods are known which have the aim of applying narrowband disturbance signals to already known disturbance signals by using digital "adaptive rejection filters" (notch filters), for example. Since the actual dispreading needs to be preceded by the performance of disturbance signal recognition, the spreading gain that is inherent in this transmission method is not used in this case.

SUMMARY

One embodiment provides a signal processing method for the receiver-end acquisition of a transmitted spread spectrum signal that is produced by transmitter-end spreading of a bit string using a spread code signal, having the following steps: reception of the spread spectrum signal disturbed by a disturbance signal during the transmission, provision of a receiver-end spread code signal which corresponds to the transmitter-end spread code signal, performance of polyphase correlations for respective different code phases which engender polyphase correlation results which are associated with respective different code phases, filtering of the polyphase correlation results using at least two of the code phases, determination of an extreme value in the filtered polyphase correlation results, and determination of the code phase associated with the extreme value.

In a further embodiment, frequency-shifted polyphase correlation results from different code phases are taken as a basis for the filtering.

In a further embodiment, averaged polyphase correlation results from different code phases are taken as a basis for the filtering and wherein the averaging is effected using polyphase correlation results from the same code phase.

In a further embodiment, the frequency shifting and the averaging are performed by means of a Fast Fourier transformation.

In a further embodiment, the polyphase correlation results are transformed into the spectral domain and the transformed polyphase correlation results are filtered in the spectral domain.

In a further embodiment, the absolute values of the transformed or frequency-shifted polyphase correlation results are formed and wherein these absolute values are taken as a basis for the filtering.

In a further embodiment, a correct frequency associated with the extreme value is determined.

In a further embodiment, the received spread spectrum signal is disturbed by a disturbance signal and wherein the filtering of the polyphase correlation results is effected by means of a filter function which minimizes the effects of the disturbance signal.

In a further embodiment, the filtering provided for the polyphase correlation results is high-pass filtering.

Another embodiment provides a signal processing arrangement which is designed to acquire at the receiver end a spread spectrum signal that is produced by transmitter-end spreading of a bit string using a spread code signal, having a correlation unit which is designed to perform polyphase correlations for respective different code phases which engender polyphase correlation results which are associated with the respective different code phases which is designed to subject the polyphase correlation results to filtering using at least two code phases, and an extreme value detector which is designed to determine an extreme value from the filtered polyphase correlation results and also to determine the associated code phase.

BRIEF DESCRIPTION OF THE DRAWINGS

Example embodiments are explained in more detail below with reference to the drawings, in which:

FIG. 7 shows a comparison of the absolute value spectra of the polyphase correlation results before and after high-pass filtering for VHF disturbance signals, FIG. 9 shows a signal flowchart for an example of signal acquisition in the case of a known frequency of the wanted signal without averaging and without frequency shifts, FIG. 10 shows a signal flowchart for an example of signal acquisition in the case of a known frequency of the wanted signal with averaging, but without frequency shifts, FIG. 11 shows a signal flowchart for an example of signal acquisition with averaging and with frequency shifts for acquisition with frequency estimation of the wanted signal.

DETAILED DESCRIPTION

Embodiments of the present disclosure provide a method and an arrangement for signal acquisition in which the aforementioned disadvantages do not occur and particularly the signal-to-jammer ratio (SJR) is improved.

For example, some embodiments provide a signal processing method for the receiver-end acquisition of a transmitted spread spectrum signal that is produced by transmitter-end spreading of a bit string using a transmitter-end spread code signal, having the following steps: reception of the spread spectrum signal disturbed during the transmission; provision of a receiver-end spread code signal which corresponds to the transmitter-end spread code signal; performance of polyphase correlations for respective different code phases which engender polyphase correlation results which are associated with respective different code phases; filtering of the polyphase correlation results using at least two of the code phases; determination of an extreme value in the filtered polyphase correlation results; and determination of the code phase associated with the extreme value.

A signal processing arrangement for this purpose has the following components: a correlation unit which is designed to perform polyphase correlations for respective different code phases of a spread code signal which engender polyphase correlation results which are associated with the respective different code phases; a filter which is designed to subject the polyphase correlation results to filtering using at least two code phases, and an extreme value detector which is designed to determine an extreme value from the filtered polyphase correlation results and also to determine the associated code phase.

Figure 1:
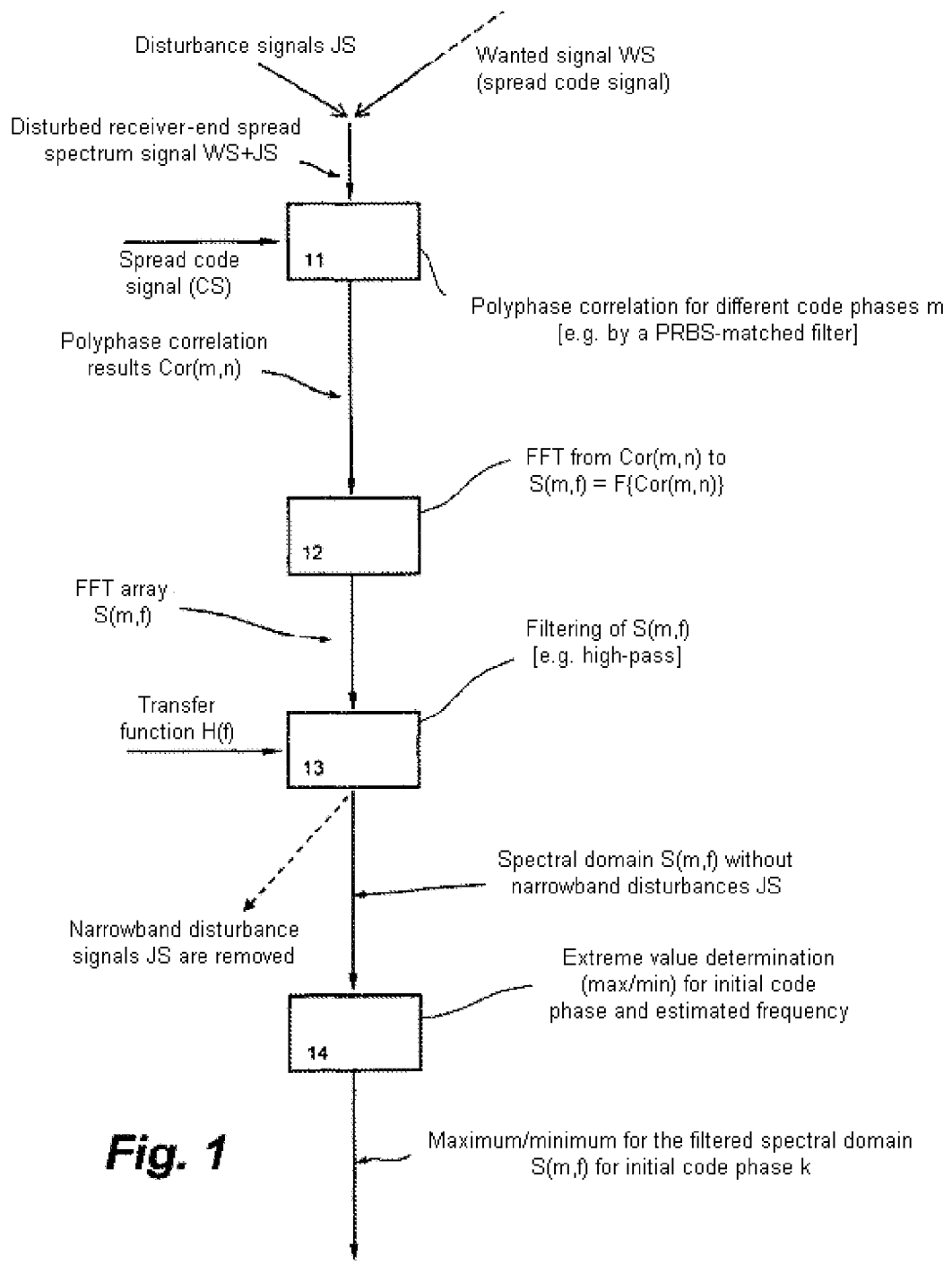
FIG. 1 shows a signal flowchart of the flow in the case of exemplary signal acquisition according to one embodiment, FIG. 2 schematically shows the temporal relationship between identical spread code signals and a spread spectrum signal for different code phases, FIG. 3 schematically shows a matrix in which polycorrelation results are stored, FIG. 4 schematically shows a further matrix in which spectral representations of polycorrelation results are stored, FIG. 5 schematically shows a disturbance signal, a transfer function for a high-pass filter and a respective wanted signal for different code phases over the frequency.

FIG. 1 shows an example of a signal processing method or a signal processing arrangement for signal acquisition in a receiver, the intention also being to discuss the principle of spread spectrum transmission in general in so far as it is of significance to understanding aspects of the present invention. Accordingly, a transmitter-end spread spectrum signal that is intended to be emitted is produced using a transmitter-end spread code signal which contains the spread bits $b0, b1, \ldots, bB$. B denotes the number of bits that are spread at the transmitter end.

Since the receiver does not know when the transmitter began to send, the receiver needs to receive a time period that is sufficient in any form, i.e. a satisfactory portion of the spread spectrum signal that is sent. Alternatively, however, the receiver can also receive continuously and hence can receive the entire sent signal, but in this case too does not know specifically when and in what way the signal arrives on it.

The received, that is to say receiver-end, spread spectrum signal is received with the disturbance and is subsequently denoted by $c_0, c_1, \ldots, c_N$. N denotes the number of received (that is to say considered at the receiver end) bits. M denotes the number of initial code phases considered at the receiver end per bit.

A receiver-end spread code signal CS is produced in the receiver and is taken as a basis for calculating the receiver-end polyphase correlations. The receiver does not know a priori what time offset or what code phase difference between the receiver-end spread code signal and the received spread spectrum signal needs to be assumed in order for the correlation to be able to be calculated with minimized code phase difference and hence for despreading to be achieved. The acquisition is thus intended to be used to find out this code phase difference that is to be assumed. Receiver-end correlation of the receiver-end spread spectrum signal to the receiver-end spread code signal CS can then be executed with a minimized code phase difference.

A polyphase correlation begins at an initial code phase. The calculation of a polyphase correlation extends over various further code phases. The calculation does not necessarily have to take place using such code phases as for their part are considered to be initial code phases. It is thus possible for more or fewer or other code phases to be used in the calculation. The code phase of a spread spectrum signal recurs after each spread bit (since the spread code signal CS which is used to "transform" the bits into chips also recurs once per bit).

The polyphase correlation results are sorted according to initial code phases, for example. Aspects of the invention involve sorting according to "the same" code phases and application of the filtering within this sorting, for example.

In the case of the signal acquisition shown by way of example in FIG. 1, the transmitter-end spread spectrum signal with the bits $b0, b1, \ldots, bB$, subsequently referred to as the wanted signal WS, is generated from a known spread sequence and a known bit string at the transmitter end and then needs to be transmitted over an enlarged frequency range. The associated received signal, the receiver-end spread spectrum signal $c_0, c_1, \ldots, c_N, \ldots, c_i$, also contains undesirable disturbance signals JS (jammer signals) in addition to the wanted signal WS, however. In addition, a delay may arise between the transmitter-end spread spectrum signal $b0, b1, \ldots, bB$ and the receiver-end spread spectrum signal $c_0, c_1, \ldots, c_N, c_i$.

In the case of receiver-end signal acquisition, the aim is for an initial code phase that is required for subsequent correct despreading, or a correct code phase k for short, to be determined from the wanted signal WS. Furthermore, the aim is optionally to determine the frequency of the wanted signal WS as accurately as possible. According to FIG. 1, the received spread spectrum signal $c_0, c_1, \ldots, c_N, \ldots, c_i$ is to this end first of all subjected to polyphase correlation for different code phases m (for example in a correlation unit 11). This step is explained in yet more detail later with reference to FIG. 2.

The polyphase correlation engenders polyphase correlation results which are subsequently denoted by Cor(m,n) in the time domain and by S(m,f), or as a spectrum S(m,f) for short, in the spectral domain, where f stands for an arbitrary frequency in this context but is also used as an index variable, depending on the case.

By way of example, an algorithm for Fast Fourier Transformation (FFT) is used to initially shift the frequency of all results within an identical initial code phase and then to form the average of said results (transformation unit 12). Various frequency channels are produced for every possible initial code phase m (multiple FFT calculation in line with the number of calculated initial code phases), for example. The number of frequency channels and the spectral arrangement thereof may be prescribed by the choice of calculation algorithm (such as FFT) and/or by the maximum tolerable frequency error for the frequency estimation, for example.

The results of the multiple FFT calculations can be represented by what is known as an FFT array. Within this FFT array, it is possible, at the correct frequency of the wanted signal WS, for the correct code phase k thereof to be recognized from a correlation peak which corresponds to the autocorrelation properties of the spread code signal CS for various code phases. Since, in contrast to the wanted signal WS, for various code phases m the predominantly narrowband disturbance signals JS bring about, in particular, low-frequency signals over various code phases m, embodiments of the invention allow the influence of said disturbance signals to be minimized over various initial code phases m by means of appropriate filtering, such as high-pass filtering (for example using a filter 13), of the FFT array.

The filtered spectrum S(m,f) is largely free of disturbance signals JS and is finally subjected to extreme value determination, for example maximum determination (extreme value detector 14). The maximum (peak) found corresponds to the wanted signal WS which has been correlated to the spread code signal at the receiver end during the correct code phase k. Hence, the necessary time offset between transmitter-end spreading and receiver-end correlation (despreading) is found.

Figure 2:
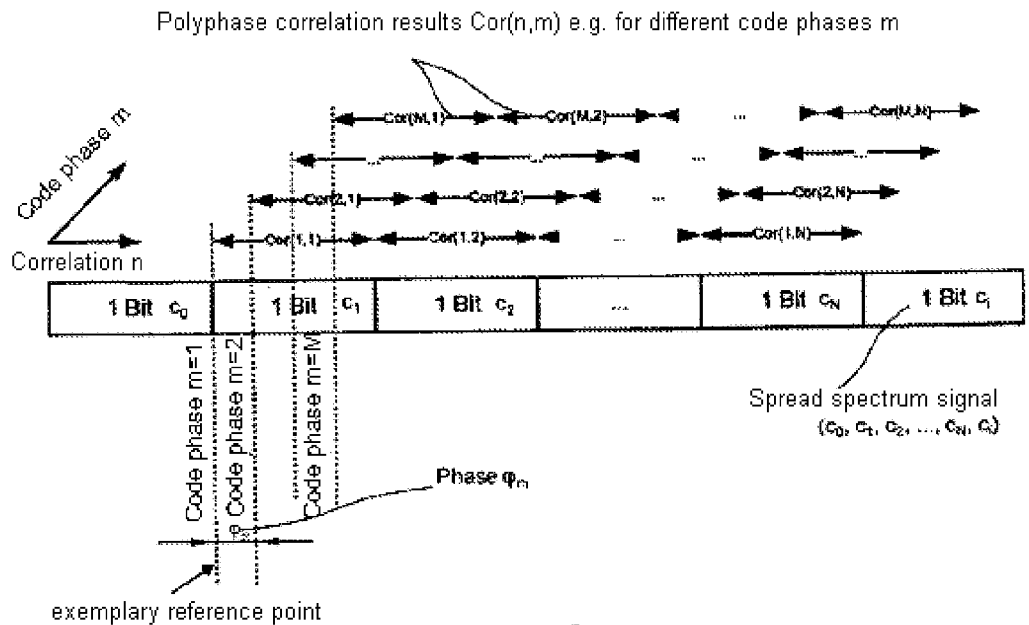

FIG. 2 schematically shows the polyphase correlation presented above. The reference signal intended to be used by way of example is the spread spectrum signal $c_0, c_1, \ldots, c_N, \ldots, c_i$, with any other signals being able to be used. The spread spectrum signal $c_0, c_1, \ldots, c_N, \ldots, c_i$ is shown bit by bit over time. Furthermore, polyphase correlations are shown, i.e. a plurality of correlations that are offset by the phase angle $\phi_m$ and that engender polyphase correlation results Cor(m,n). The beginning of the bit $c_1$ of the spread spectrum signal $c_0, c_1, \ldots, c_N, \ldots, c_i$ has been chosen as a reference point for the phase angle $\phi_m$ in the example shown and corresponds to the correct initial code phase k.

There is a time offset that needs to be assumed by the receiver and that is intended to be used to minimize the code phase difference. With a minimized code phase difference, the correlation in the receiver begins at the correct initial code phase k. There is a correct initial code phase k for each bit. The polyphase correlations are employed over various code phases (that recur for each bit) which begin at different initial code phases m. Since each bit is spread with a complete pass of the spread code sequence CS, the code phases recur for each bit (mod(M)). The corresponding situation otherwise also applies to sampled signals having a plurality of samples per chip, it being entirely possible for (slightly) altered code phase constellations to arise for different "despread" signals/bits by virtue of the sample rate to the chip rate not corresponding to an integer ratio.

For each code phase m, a "correlation result signal" is produced, such as [Cor (m=2,n=1), Cor(2,2), ..., Cor(2,N)], each of these signals comprising N considered bits. In this case, it should be borne in mind that only when the code phase m and the frequency f are correct is it possible to refer to a despread signal, otherwise a despreading attempt or "despread" signals is/are preferred). With M different code phases, M "correlation result signals" are obtained in the example shown in FIG. 2.

In the present example, the despread signal from the code phase m=1 is in phase with the spread spectrum signal ($\phi_m$=0). Of the "correlation result signals" attained for different code phases m (polyphase correlation results), only that signal which has been correlated to the correct code phase (m=)k corresponds to the despread wanted signal WS. The presence of predominantly narrowband disturbance signals produces at least similar "despread" signals $s_m(n)$ for adjacent code phases m, that is to say for a code phase m=i and a code phase m=j, for example, where j=i+1, for example. If the narrowband disturbance signal is a continuous wave signal (CW signal), for example, that is to say a signal having constant frequency and constant amplitude, then just one phase difference arises between the different "despread" signals $s_m(n)$.

Figure 3:
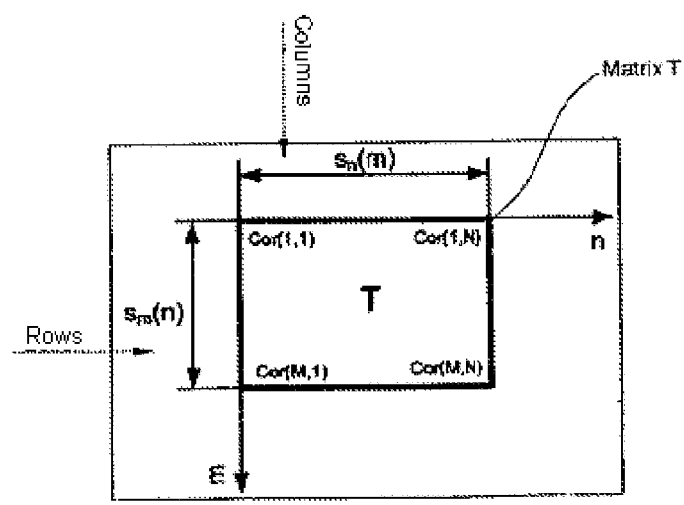

FIG. 3 shows an example of a matrix T in which the polyphase correlation results Cor(m,n) are arranged in rows and columns. By way of example, the matrix T may be stored in a memory for processing via a digital signal processor. In the present example, row-by-row reading of the matrix T produces one respective signal $s_m(n)$ ("despread" signal) per row for respective different code phases m. By contrast, column-by-column reading produces a respective signal $s_n(m)$. The matrix T represents the polyphase correlation results Cor(m,n) in the time domain.

Figure 4:
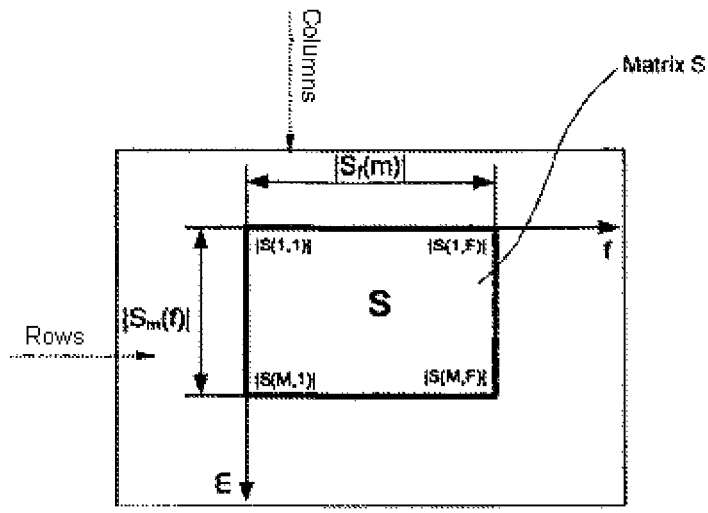

Furthermore, the polyphase correlation results Cor(m,n) are transformed to the spectral domain (frequency domain) by means of Fourier transformation, for example. The spectral domain or the spectrum S(m,f)=F{Cor(m,n)} can likewise be stored as a matrix, matrix S, as shown in FIG. 4. In the present example, however, the absolute value spectrum |S(m, f)| is stored as matrix S. Row-by-row reading therefore produces a signal |$S_m(f)$|, and column-by-column reading produces a signal |$S_f(m)$|. In this case, a spectral transformation of the polyphase correlation results Cor(m,n) is even obtained as an approximation.

As already explained for adjacent code phases m, that is to say for a code phase m=i and a code phase m=j, for example, where j=i+1, for example, presence of predominantly narrowband disturbance signals JS produces at least similar "despread signals" $s_m(n)$. If the narrowband disturbance signals JS are merely continuous wave signals (CW) at constant frequency and constant amplitude, for example, then again just one phase difference arises between the different "despread" signals $s_m(n)$. If the spectra $S_m(f)$=F{$s_m(n)$} are considered, corresponding similar absolute values are obtained for adjacent values of |$S_m(f)$|. When continuous wave disturbance signals (CW JS signals) are present, |$S_i(f)$|=|$S_j(f)$| even applies to adjacent absolute values, for example, i,j≤M and M being the number of code phases m. CW JS signals are very rare, however. Generally, narrowband disturbance signals JS can be expected. In that case, adjacent absolute values in the spectral domain are at least similar, i.e. |$S_i(f)$|≈|$S_j(f)$|. In the case of narrowband disturbance signals JS, it may be that |i−j|≤M', for example, where M' may be different for each disturbance signal type.

If the matrix S is read in the m direction, for example, then the resultant signals |$S_f(m)$| contain low-frequency spectral components which are brought about by the predominantly narrowband disturbance signal JS. At particular frequencies f, a CW JS signal produces a constant signal which corresponds to a DC component in F{$S_f(m)$}. As mentioned, however, CW signals occur rarely in practice. For the wanted signal WS, a pulse-like behavior is obtained for the absolute value spectra |$S_f(m)$| ascertained from the various "despread" signals $S_m(n)$ at the correct frequency $f_k$ and with the correct code phase.

The correct frequency $f_k$ is understood to mean that frequency of the spread code signal which has been used to spread the signal WS at the transmitter end. In this case, it should be borne in mind that the frequency cannot be determined with arbitrary accuracy at the receiver end on account of the intervals of the frequency channels. The properties of the resultant pulse are prescribed particularly for various code phases by the properties of the spread code that has been modulated onto the spread code signal, for example the autocorrelation properties of the spread sequence (codes).

Figure 5:
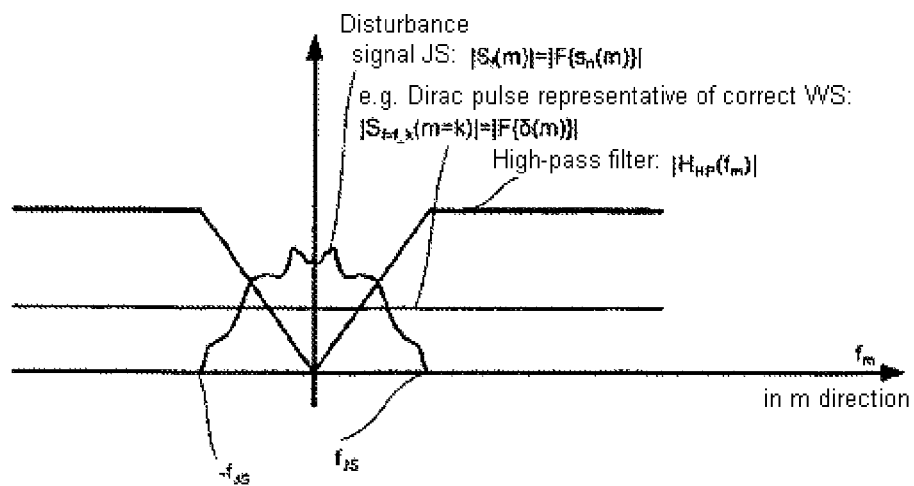

FIG. 5 shows a graph for an example of the spectral profile for high-pass filtering of the absolute value spectra of the polyphase correlation results |$S_f(m)$|. The correct signal WS, that is to say the signal that was originally spread at the transmitter end, is provided, by way of example, by a Dirac pulse in the frequency domain—which corresponds to ideal autocorrelation properties—for the sake of simplicity. The narrowband disturbance signal JS that is overlaid on the signal WS is within a disturbance frequency range $f_m$=[−$f_{JS}$, $f_{JS}$]. The transfer function $H_{HP}(f_m)$ of a high-pass filter is now designed such that the frequency components of the disturbance signal (disturbance frequency range) are attenuated, ideally rejected. The character of the wanted signal WS is retained, since the disturbance frequency range that is filtered out is very small in comparison with the entire frequency spectrum of the signal WS. One embodiment option for the transfer function $H_{HP}(f_m)$ is explained further down with reference to an exemplary embodiment.

Instead of the high-pass filter function described hitherto, other filter functions can also be used. As becomes clear particularly from the graphs in FIGS. 6 and 7, different types of disturbance signals JS produce different profiles in the signals $S_f(m)$ that are to be filtered according to the invention. In this context, FIGS. 6 and 7 show a comparison of the absolute value spectra of the polyphase correlation results |S(m,f)| from different, disturbed spread spectrum signals before and after the filtering using a high-pass filter, with FIG. 6 relating to continuous wave disturbances (CW) and FIG. 7 relating to VHF disturbances (VHF).

Accordingly, it is possible to use specifically optimized filter functions for specific types of disturbance sources, said filter functions being particularly effective at rejecting the profiles that correspond to the respective type of disturbance in $S_f(m)$, but at the same time retaining the peak of the wanted signal WS to a sufficient extent and not producing any further, erroneous peaks which corrupt the extreme value detection.

Figure 6:
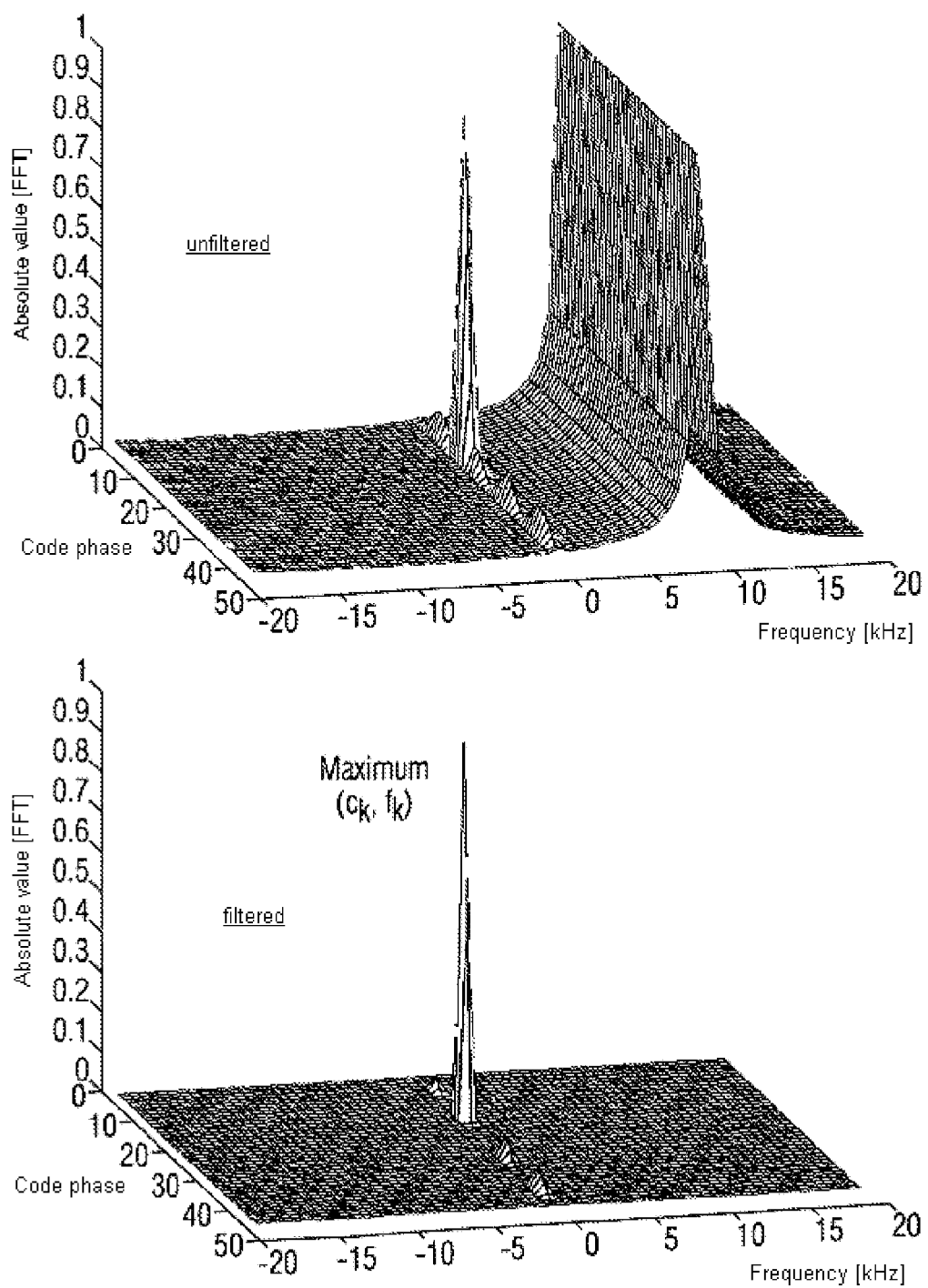
FIG. 6 shows a comparison of the absolute value spectra of the polyphase correlation results before and after high-pass filtering for continuous wave disturbance signals.

In this context, the high-pass filter function that has been discussed by way of example with reference to FIGS. 6 and 7, in particular, is a filter optimized for rejecting a CW disturbance signal. The CW disturbance signal produces a constant profile in the signals $S_f(m)$, that is to say a DC component from a spectral point of view. This DC component can best be rejected by a high-pass filter.

Disturbance signals which have a relatively large spectral width generally produce higher-frequency spectral components in the signals $S_f(m)$, for example. This also makes it clear that different optimum rejection filters can exist for different types of disturbance signals, which rejection filters very largely reject the profiles produced by the respective type of disturbance source in $S_f(m)$ and in so doing or thereby allow extreme value detection. In practice, compromises are frequently made between different types of disturbance sources, for example including noise, or else combinations of filters or filter functions are provided in order to counteract particular disturbance sources.

The correct code phase k is ascertained by extreme value detection (extreme value determination) from the FFT array or the absolute value spectrum $|S(m,f)|$. The correlation results for the correct code phase k differ (including in the spectral domain) from those with respective incorrect code phases in that a distinct maximum is obtained in that case. In the simplest case, the extreme value detection is merely the search for the maximum.

The maximum is obtained particularly for the code phases on the basis of the autocorrelation properties of the spread code signal. Autocorrelation is understood in signal processing to mean the correlation of a signal to itself. When the signal that is spread using the spread code sequence at the transmitter end is correlated to the spread code sequence at the receiver end, a function is obtained which at least approximately has the autocorrelation properties of the spread code sequence used. In the case of the particular correct code phase k and the particular correct frequency $f_k$, the characteristic maximum is obtained. In the case of an incorrect frequency $f_f$ and/or an incorrect code phase $m_f$, no extreme value is obtained on the basis of the autocorrelation properties.

If, by contrast, no (high-pass) filtering of the polyphase correlation results $S(m,f)$ is performed, then the disturbance signals are essentially retained in $|S_m(f)|$. This can result in incorrect decisions when determining the correct code phase k and the signal frequency of the wanted signal WS using extreme value determination (cf. FIGS. 6 and 7).

Hence, in one embodiment, the received spread spectrum signal WS, which is disturbed by the disturbance signals JS, is thus subjected to polyphase correlation, and the polyphase correlation results $(Cor(m,n), S(m,f))$ are filtered using a filter function which minimizes the effects of the disturbance signal. In particular, appropriate filtering of the polyphase correlation results $(S(m,f))$ attenuates the spectral domain which is impaired by the disturbances.

Figure 8:
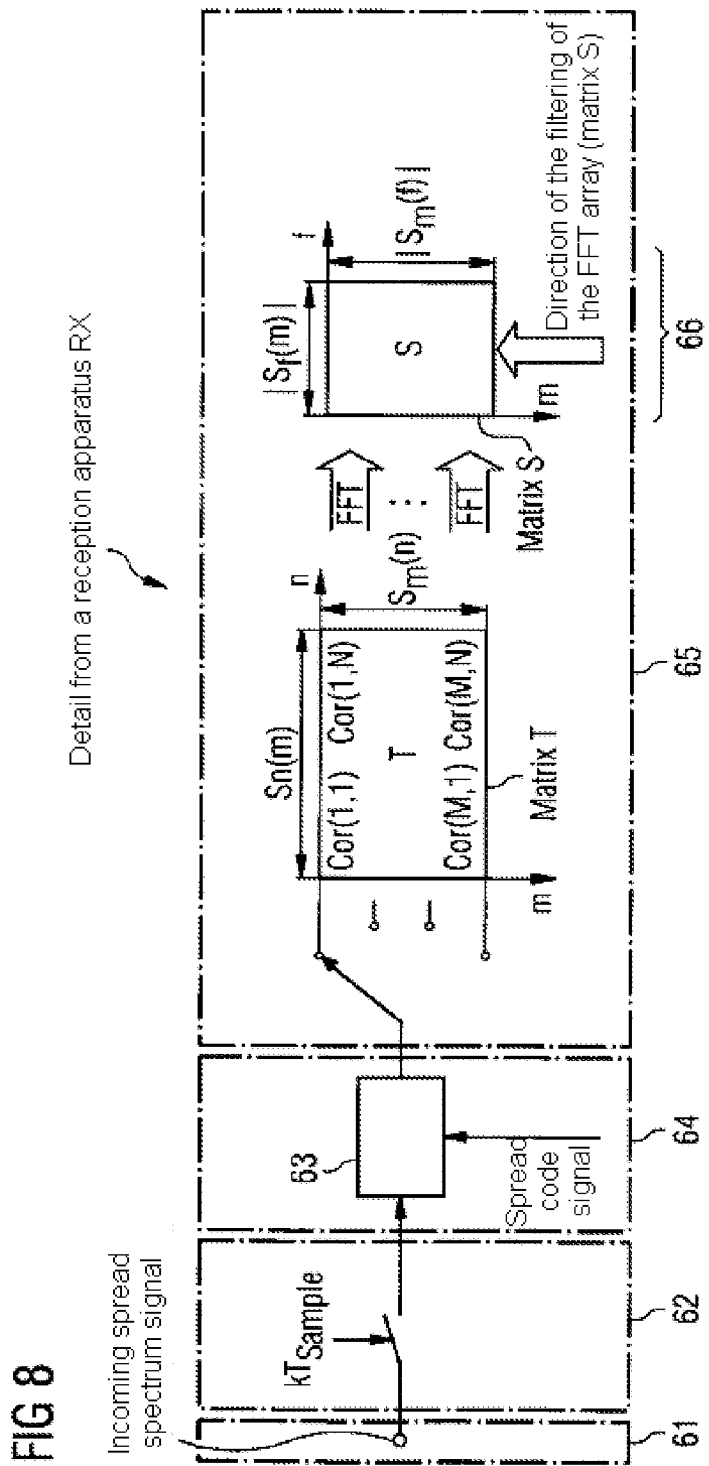
FIG. 8 shows a signal flowchart for the essential components of a signal processing arrangement according to one embodiment.

FIG. 8 uses a signal flowchart by way of example to show the essential components of a suitable signal processing arrangement in baseband. Said arrangement comprises a reception apparatus RX having a receiver unit 61 for receiving the spread spectrum signal $c_0, c_1, \ldots, c_N, \ldots, c_i$. The received spread spectrum signal $c_0, c_1, \ldots, c_N, \ldots, c_i$ is sampled by means of a sampling unit 62 using the sampling time $kT_{sample}$. The sampled spread spectrum signal $c_0, c_1, \ldots, c_N, \ldots, c_i$ is then supplied to a correlator 64 for polyphase correlation. By way of example, the polyphase correlation can be carried out by means of a matched filter G3 (also called optimum filter), particularly by means of a PBRS matched filter.

The correlation itself achieves an inherent SJR performance. A processing unit 65 ensures that the spread spectrum signal $c_0, c_1, \ldots, c_N, \ldots, c_i$ is "despread" for various code phases m and that the polyphase correlation results $Cor(m,n)$ are stored in a matrix T, for example. For this purpose, the processing unit 65, which may be in the form of a digital signal processor, for example, has a suitable memory unit. In addition, the processing unit 65 is designed to perform FFT for the matrix T and to store results on the basis of absolute value in a matrix S, forming an FFT array.

Preferably, the correlator 64 may—as mentioned—be in the form of a filter (MF) that is optimized for a pseudo-random bit sequence. Alternatively, pseudo-random binary sequences (PRBS) can be produced (calculation specification) using linear feedback shift registers (LFSR), for example, said sequences approximating the spectrum of white noise using random natural fluctuation phenomena.

The reception apparatus RX also has a high-pass filter 66 which subjects the absolute value spectrum $|S(m,f)|$ which is stored in the matrix S to inventive high-pass filtering in order to reject the narrowband disturbance signals JS. By way of example, the high-pass filter 66 may be implemented in the processing unit 65. By way of example, the high-pass filter may have the following transfer function:

$$y_{HP}(m) = (2 \cdot SF + 1) \cdot x(m) - \sum_{k=-SF}^{+SF} x(m+k), \quad (1)$$

A surrounding factor, factor SF, indicates the number of adjacent code phases around the currently considered code phase which is used to calculate the absolute value difference, for example. In this case, y is the filter input signal, x is the filter output signal and k is a running variable.

The disclosed method and arrangement can also be used advantageously for the progressive acquisition of signals that have been spread on a multiple basis. Progressive acquisition is understood to mean the step-by-step synchronization to the full signal spreading. This is made possible by multiple (minimal: 2) spreading using "small" spread code sequences for the signal spreading. During the progressive acquisition, portions of the whole signal spreading are first of all used, which first of all results in lower disturbance signal immunity from the point of view of the spread code (lower spread gain). The disclosed method allows (over) compensation for this reduced disturbance signal immunity at least for important disturbance signal types.

FIG. 9 shows a signal flowchart for an example of signal acquisition at a known frequency of the wanted signal without averaging and without frequency shifts. To this end, a received signal 90, which is a disturbed spread spectrum signal, is sampled at discrete times $kT_{sample}$ and is supplied to a correlator 91. The latter provides polyphase correlation results $Cor(m,n)$ which are input into an array 93 (for example a memory) having a single-column, m-row matrix structure by means of a distributor device 92 in the order of their code phases. In this case, it is true that n=1 and m=1 ... M for the polyphase correlation results $Cor(m,n)$ and associated row vectors $s_n(m)$. Over the polyphase correlation results $Cor(m, 1)$ along the single column, high-pass filtering (or other suitable filtering) is then performed.

FIG. 10 shows a signal flowchart for an example of signal acquisition at a known frequency of the wanted signal with averaging, but without frequency shifts. To this end, a received signal 100, which is a disturbed spread spectrum signal, is sampled at times $kT_{sample}$ and is supplied to a correlator 101. The latter provides polyphase correlation results $Cor(m,n)$ which are input into an array 103 having an n-column, m-row matrix structure by means of a distributor device 102 per column in the order of their code phases. This means that every output value from the correlator 101 prompts the distributor device 102 to switch to one row lower. After M (number of possible code phases under consideration) has been reached, the distributor device 102 begins at the first row again, with the results then being entered into the next column, however.

In this case, it is true that n=1 ... N and m=1 ... M for the polyphase correlation results $Cor(m,n)$ and associated row vectors $s_n(m)$. Over the polyphase correlation results Cor(m, n) along the rows, averages (AVG) are then formed in an averaging device 104 and the averaged correlation results S(f,m) are entered into an array 105 having a single-column, m-row matrix structure (f=0; m=1 ... M). There, high-pass filtering (or other suitable filtering) is then performed along the single column.

FIG. 11 shows a signal flowchart for an example of signal acquisition with averaging and with frequency shifts for acquisition with frequency estimation of the wanted signal. To this end, a received signal 110, which is a disturbed spread spectrum signal, is sampled at the times $kT_{sample}$ and is supplied to a correlator 111. The latter provides polyphase correlation results Cor(m,n) which are entered into an array 113 having an n-column, m-row matrix structure by means of a distributor device 112 per column or column vector $s_m(n)$ in the order of their code phases. In this case, it is true that n=1 ... N and m=1 ... M for the polyphase correlation results Cor(m,n) and associated row vectors $s_n(m)$.

The polyphase correlation results Cor(m,n) are then used to perform an FFT calculation on a row-by-row basis. When all the samples from a row have been fed into an FFT unit 115, a distributor device 114 that is downstream of the array 113 switches to one row lower and a further FFT calculation begins. The FFT unit 115 thus calculates a result $S_m(f)=F(s_m(n))$ for all of the correlation results from a code phase, i.e. for each switch position of the distributor device 114.

This result $S_m(f)$ is input into an array 117 on a row-by-row basis by means of a distributor device 116. After every completed FFT calculation, the distributor device 116 switches one position (row) downward. Hence, the distributor devices 114 and 116 move essentially in sync, whereas distributor device 112 by contrast moves much more quickly—in time with the arriving correlation results.

In the FFT unit 115, each incoming sample is respectively multiplied by signals $f_1 \ldots f_F$ (F multiplications per sample). Results that result therefrom are then transferred to averaging (AVG) and then engender the signals $S_{f1}(m) \ldots S_{fF}(m)$. In the case of FFT, this results in N output values being calculated from N input samples, said output values representing the spectral content of the input signal.

Figure 12:
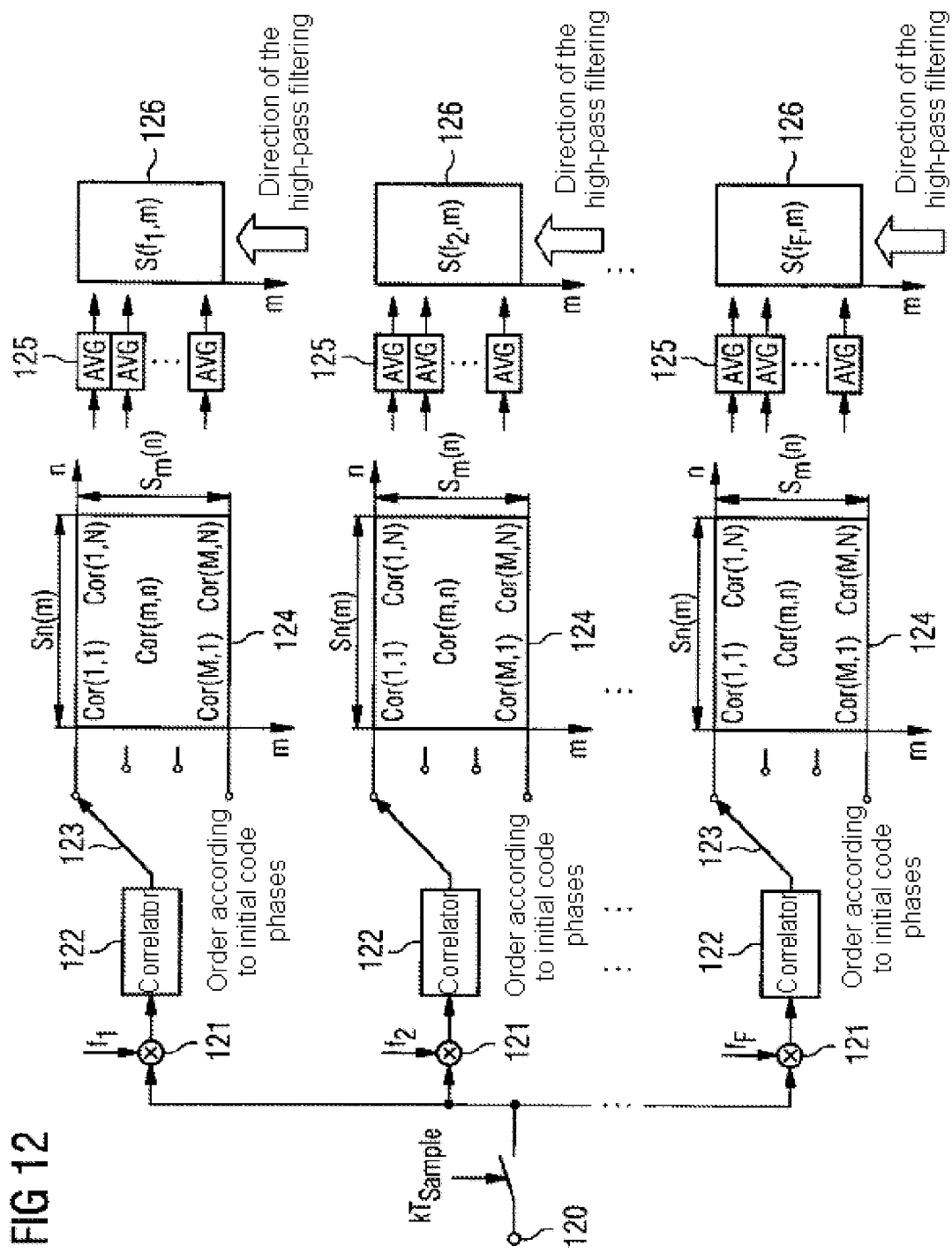
FIG. 12 shows a signal flowchart for a further example of signal acquisition with frequency shifts and with averaging for acquisition with a frequency estimation of the wanted signal.

FIG. 12 shows a signal flowchart for a further example of signal acquisition with frequency shifts and with averaging operations for acquisition with frequency estimation. In this case, a received signal 120, which is a disturbed spread spectrum signal, is sampled at times $kT_{sample}$ and supplied to poly frequency shifting by means of F multipliers 121, for example. Each of the F multipliers is followed by a correlator 122 which provides polyphase correlation results Cor(m,n) which are input into an array 124 having an n-column, m-row matrix structure by means of a distributor device 123 per column in the order of their code phases.

Over the polyphase correlation results Cor(m,n) along the rows, averages (AVG) are then formed in an averaging device 125 and the averaged correlation results S(f,m) are input into an array 126 having a single-column, m-row matrix structure (f=0; m=1 ... M). There, high-pass filtering (or other suitable filtering) is then performed along the single column. The function of correlator 122, distributor device 123, array 124, averaging device 125 and array 126 together per multiplier 121 is otherwise as for the structure shown in FIG. 10.

An advantage of the processing structure shown in FIG. 12 is that in the case of radio-frequency transmission with receiver-end frequency conversion to a baseband it is possible for the frequency offset to take place together with the conversion as early as at the radio-frequency end.

Figure 13:
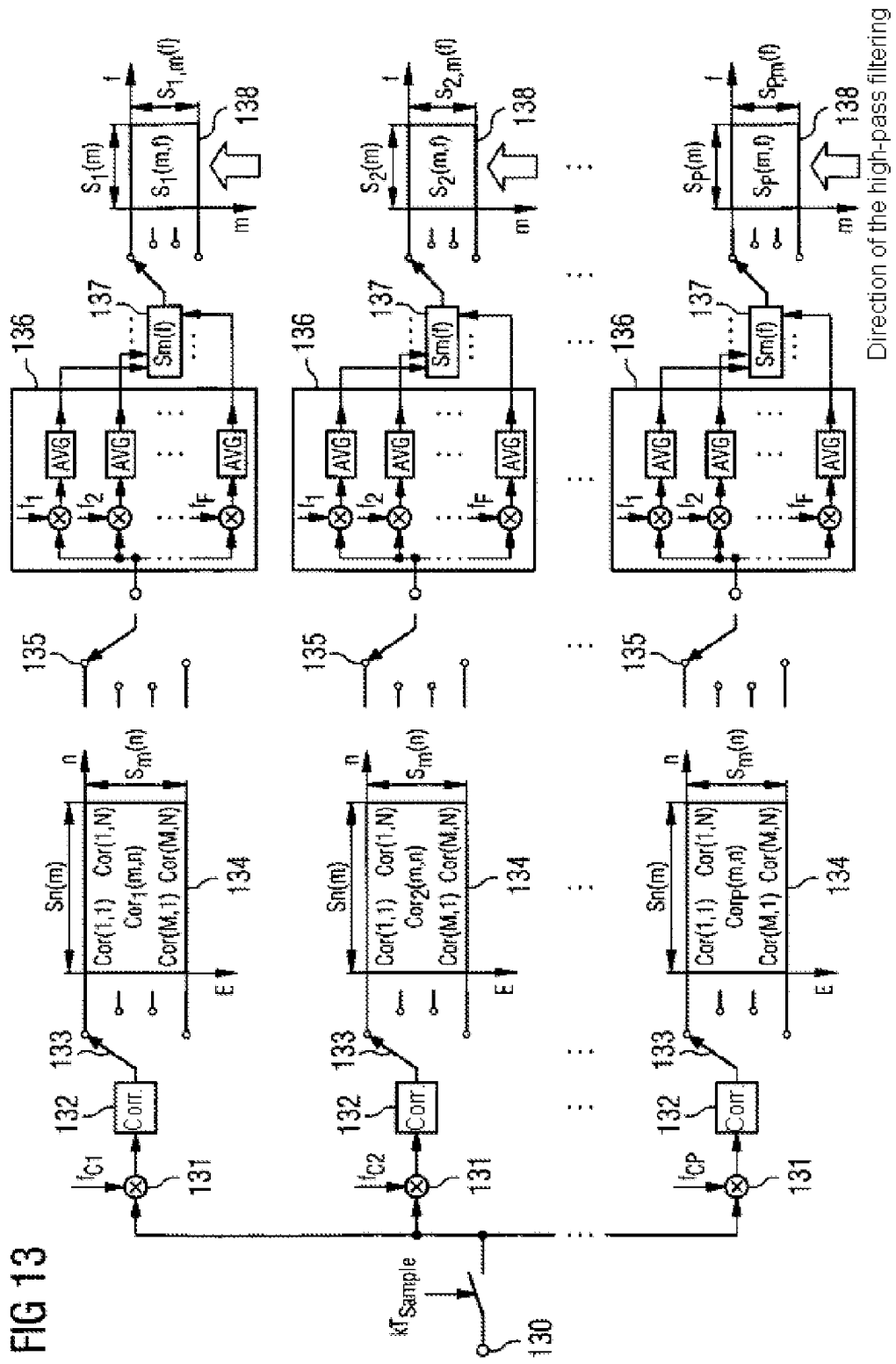
FIG. 13 shows a signal flowchart for a further example of signal acquisition with frequency shifts before and after the polyphase correlation.

FIG. 13 shows a signal flowchart for a further example of signal acquisition in which provision is made for frequency shifts before and after the polyphase correlation. In this case, a received signal 130, which is a disturbed spread spectrum signal, is sampled at times $kT_{sample}$ and is supplied to poly frequency shifting by means of P multipliers 131, for example. Each of the P multipliers is followed by a correlator 132 which provides polyphase correlation results Cor(m,n) which are input into an array 134 having an n-column, m-row matrix structure by means of a distributor device 133 per column in the order of their code phases.

The polyphase correlation results Cor(m,n) are then each supplied along the rows by means of a distributor device 135 to an FFT unit 136 for row-by-row FFT calculation using the polyphase correlation results Cor(m,n). That is to say that after all of the samples in a row have been fed into the FFT unit 136, the distributor device 135 that is downstream of the array 134 switches to one row lower and a further FFT calculation begins. The FFT unit 136 thus calculates a result $S_m(f)=F(S_m(n))$ for all of the correlation results from a code phase, i.e. for each switch position of the distributor device 135.

This result $S_m(f)$ is input into an array 138 on a row-by-row basis by means of a distributor device 137. After each completed FFT calculation, the distributor device 137 switches to one position (row) downward. Hence, the distributor devices 135 and 137 move essentially in sync. In the FFT unit 136, each incoming sample is multiplied by respective signals $f_1 \ldots f_F$ (F multiplications per sample). Results that result therefrom are then transferred to averaging (AVG) and then engender the signals $S_{f1}(m) \ldots S_{fF}(m)$. As a result, N output values are calculated from N input samples in the case of an FFT, said output values representing the spectral content of the input signal. The (high-pass) filtering then again takes place as already described in connection with FIGS. 8 to 12.

The advantage of a structure as outlined in FIG. 13 is firstly that it is possible to (recurrently) use the same FFT blocks for implementing a plurality of frequency offsets. Secondly, correlations are calculated with a relatively small frequency error, particularly in comparison with the case in which the error range that is possible as a whole for the signal frequency of the wanted signal is handled by just one correlator.

As can be seen from the explanations pertaining to FIGS. 11 to 13, it is possible to apply correlation, frequency shifting and/or averaging in a different order. According to FIG. 11, it is possible to provide the correlation first of all, then the frequency shifting and then the averaging, for example, or according to FIG. 12, for example, it is possible to perform first the frequency shifting, then the correlation and then the averaging, or according to FIG. 13 it is possible for frequency shifts to take place before and after the polyphase correlation.

For the "averaging", particularly in the exemplary embodiments in FIGS. 10 to 13, it is possible to use any desired form of averaging, such as the arithmetic mean, the geometric mean or the windowed arithmetic mean, for example, in which case suitable windows are what are known as Blackman windows, Hamming windows, Hann windows, etc. Specific low-pass filtering would also be conceivable.

Furthermore, besides the implementation options shown, (further) implementations using real and complex signal processing are also possible.

LIST OF REFERENCE SYMBOLS $c_0, c_1, c_2, \ldots, c_N, c_i$ (disturbed) spread spectrum signal
$n_1, n_2, \ldots, n_N$ Spread code signal
m Code phase
n Correlation
M Number of code phases
N Number of correlations per code phase
$\phi_m$ Phase, phase difference
k Index for initial code phase
Cor(m,n) Polyphase correlation results
S(m,f) Spectral domain for Cor(m,n)
T Matrix with Cor(m,n)
S Matrix with S(m,f)
$s_n(m)$ Signal for matrix T read on a column-by-column basis
$s_m(n)$ Signal for matrix T read on a row-by-row basis
$S_f(m)$ Signal for matrix S read on a column-by-column basis
$S_m(f)$ Signal for matrix S read on a row-by-row basis
JS (narrowband) disturbance signals (jammer signals)
WS Wanted signal
FFT Fast Fourier Transform
H(f) Transfer function (high-pass filter)
$kT_{sample}$ Sampling time
$f_{JS}$ Bandwidth of the disturbance signals
$c_k$ Initial code phase
$f_k$ Correct frequency for initial code phase
11 Polyphase correlation, correlation unit
12 Transformation to spectral domain, transformation unit
13 Filtering of the spectral domain, filter
14 Extreme value detection, extreme value detector
61 Receiver unit
62 Sampling unit
63 Matched filter
64 Correlator
65 Processing unit
66 High-pass filter
91 Correlator
92 Distributor device
93 Array
100 Received signal
101 Correlator
102 Distributor device
103 Array
104 Averaging device
105 Array
110 Received signal
111 Correlator
115 FFT unit
116 Distributor device
117 Array
120 Received signal
121 Multiplier
122 Correlator
123 Distributor device
124 Array
125 Averaging device
126 Array
130 Received signal
131 Multiplier
132 Correlator
133 Distributor device
134 Array
135 Distributor device
136 FFT unit
137 Distributor device
138 Array

What is claimed is:

1. A signal processing method for the receiver-end acquisition of a transmitted spread spectrum signal that is produced by transmitter-end spreading of a bit string using a spread code signal, the method comprising:
receiving the spread spectrum signal disturbed by a disturbance signal during the transmission,
providing a receiver-end spread code signal which corresponds to the transmitter-end spread code signal,
performing polyphase correlations for multiple different code phases which engender polyphase correlation results which are associated with respective different code phases, wherein the output of the polyphase correlations defines (a) a signal profile including a correlation peak associated with the spread spectrum signal and (b) at least one signal profile associated with the disturbance signal,
filtering the polyphase correlation results using at least two of the code phases to selectively reduce the magnitude of the at least one signal profile associated with the disturbance signal, while retaining a peak corresponding to the correlation peak associated with the spread spectrum signal,
determining from the filtered polyphase correlation results an extreme value corresponding to the peak retained by the filtering process, and
determining the code phase associated with the extreme value.

2. The signal processing method of claim 1, wherein the filtering is based on frequency-shifted polyphase correlation results from different code phases.

3. The signal processing method of claim 1, wherein the filtering is based on averaged polyphase correlation results from different code phases, and wherein the averaging is effected using polyphase correlation results from the same code phase.

4. The signal processing method of claim 3, comprising performing the frequency shifting and the averaging using a Fast Fourier transformation.

5. The signal processing method of claim 1, comprising transforming the polyphase correlation results into the spectral domain, and filtering the transformed polyphase correlation results in the spectral domain.

6. The signal processing method of claim 1, wherein the filtering is based on the absolute values of the transformed or frequency-shifted polyphase correlation results.

7. The signal processing method of claim 1, comprising determining a correct frequency associated with the extreme value.

8. The signal processing method of claim 1, wherein:
the received spread spectrum signal is disturbed by a disturbance signal, and
the filtering of the polyphase correlation results comprises a filter function that minimizes the effects of the disturbance signal.

9. The signal processing method of claim 1, wherein the filtering provided for the polyphase correlation results is high-pass filtering.

10. A signal processing arrangement configured to acquire at the receiver end a spread spectrum signal produced by transmitter-end spreading of a bit string using a spread code signal, comprising:
a correlation unit configured to perform polyphase correlations for multiple different code phases which engender polyphase correlation results which are associated with the respective different code phases, wherein the output of the polyphase correlations defines (a) a signal profile including a correlation peak associated with the spread spectrum signal and (b) at least one signal profile associated with the disturbance signal, a filtering unit configured to subject the polyphase correlation results to filtering using at least two code phase to selectively reduce the magnitude of the at least one signal profile associated with the disturbance signal, while retaining a peak corresponding to the correlation peak associated with the spread spectrum signal, and an extreme value detector configured to:
  determine from the filtered polyphase correlation results an extreme value corresponding to the peak retained by the filtering process, and
  determine the code phase associated with the extreme value.

11. The signal processing arrangement of claim 10, wherein the filtering is based on frequency-shifted polyphase correlation results from different code phases.

12. The signal processing arrangement of claim 10, wherein the filtering is based on averaged polyphase correlation results from different code phases, and wherein the averaging is effected using polyphase correlation results from the same code phase.

13. The signal processing arrangement of claim 12, wherein the correlation unit is configured to perform the frequency shifting and the averaging using a Fast Fourier transformation.

14. The signal processing arrangement of claim 10, wherein the correlation unit is configured to transform the polyphase correlation results into the spectral domain, and filter the transformed polyphase correlation results in the spectral domain.

15. The signal processing arrangement of claim 10, wherein the filtering is based on the absolute values of the transformed or frequency-shifted polyphase correlation results.

16. The signal processing arrangement of claim 10, wherein the extreme value detector is configured to determine a correct frequency associated with the extreme value.

17. The signal processing arrangement of claim 10, wherein:
  the received spread spectrum signal is disturbed by a disturbance signal, and
  the filtering of the polyphase correlation results comprises a filter function that minimizes the effects of the disturbance signal.

18. The signal processing arrangement of claim 10, wherein the filtering provided for the polyphase correlation results is high-pass filtering.

* * * * *